US012749904B2

(12) United States Patent
Ait El Bacha et al.

(10) Patent No.: US 12,749,904 B2
(45) Date of Patent: Sep. 29, 2026

(54) DYNAMIC SYSTEM FOR BALANCING CHARGING VOLTAGE FOR BATTERY MODULES

(71) Applicant: RENAULT S.A.S, Boulogne Billancourt (FR)

(72) Inventors: Abdeslam Ait El Bacha, Maisons-Alfort (FR); Jean-Roch Mauduit, Guyancourt Cedex (FR)

(73) Assignee: AMPERE S.A.S., Boulogne Billancourt (FR)

( * ) Notice: Subject to any disclaimer, the term of this patent is extended or adjusted under 35 U.S.C. 154(b) by 783 days.

(21) Appl. No.: 18/247,566

(22) PCT Filed: Sep. 20, 2021

(86) PCT No.: PCT/EP2021/075784

§ 371 (c)(1),
(2) Date: Mar. 31, 2023

(87) PCT Pub. No.: WO2022/069277

PCT Pub. Date: Apr. 7, 2022

(65) Prior Publication Data

US 2023/0378771 A1 Nov. 23, 2023

(30) Foreign Application Priority Data

Oct. 2, 2020 (FR) ..................................... 20 10085

(51) Int. Cl.
*H02J 7/52* (2026.01)
*H02J 7/61* (2026.01)

(52) U.S. Cl.
CPC . *H02J 7/52* (2026.01); *H02J 7/61* (2026.01)

(58) Field of Classification Search
CPC ..................................... H02J 7/52; H02J 7/61
(Continued)

(56) References Cited

U.S. PATENT DOCUMENTS 10,756,548 B2 * 8/2020 Syouda ..................... H02J 7/52
2012/0212182 A1 8/2012 Li
(Continued)

FOREIGN PATENT DOCUMENTS

CN 111431227 A 7/2020
JP 2019-80473 A 5/2019

OTHER PUBLICATIONS

International Search Report issued Dec. 8, 2021 in PCT/EP2021/075784, filed on Sep. 20, 2021, 2 pages.
(Continued)

*Primary Examiner* — Suchin Parihar
(74) *Attorney, Agent, or Firm* — Oblon, McClelland, Maier & Neustadt, L.L.P.

(57) ABSTRACT

A battery for storing electrical energy includes: a plurality of battery modules that are electrically connected by an electrical circuit, and a switching unit that includes a plurality of switches arranged on the electrical circuit and designed to connect the battery modules in series in the electrical circuit during a phase of the battery being charged by a charger. The switching unit also includes a system for balancing the charging of the battery modules, which is arranged on the electrical circuit and modifies the electrical circuit to divert a portion of the current being delivered to one of the battery modules which is being overcharged to another of the battery modules which is being undercharged, in a mixed phase during which the battery is simultaneously being charged by the charger and discharged into a consumer circuit that the battery is supplying with electrical power.

12 Claims, 1 Drawing Sheet

(58) Field of Classification Search
USPC .......................................................... 320/116
See application file for complete search history.

(56) References Cited

U.S. PATENT DOCUMENTS

| | | | | |
|---|---|---|---|---|
| 2017/0141586 | A1* | 5/2017 | Pernyeszi | H02J 7/52 |
| 2018/0062402 | A1* | 3/2018 | Syouda | H02J 7/52 |
| 2019/0097434 | A1* | 3/2019 | Kim | H02J 7/54 |
| 2020/0185936 | A1 | 6/2020 | Oishi et al. | |
| 2021/0218251 | A1* | 7/2021 | Chettiar | H02J 7/35 |
| 2024/0170978 | A1* | 5/2024 | Chettiar | H02J 7/575 |

OTHER PUBLICATIONS

French Preliminary Search Report issued Jun. 23, 2021 in French Application 20 10085, filed on Oct. 2, 2020, 3 pages (with English Translation of Categories of Cited Documents).

* cited by examiner

DYNAMIC SYSTEM FOR BALANCING CHARGING VOLTAGE FOR BATTERY MODULES

TECHNICAL FIELD OF THE INVENTION

The present invention relates generally to batteries for storing electrical energy. It relates more particularly to a battery for storing electrical energy comprising:

- a plurality of battery modules which are electrically connected by an electrical circuit, each battery module being adapted to store electrical energy, and
- a switching unit which comprises a plurality of switches which are arranged on the electrical circuit and adapted to connect the battery modules in series in the electrical circuit during a phase of charging the battery by means of a charger.

The invention finds an advantageous application in a battery for a land, river or air transport vehicle, in particular for an electric vehicle. It is particularly adapted to being recharged quickly, at a voltage which is higher than the nominal voltage which it delivers to supply the components of the vehicle with electrical energy.

It also relates to a method for controlling such a battery in order to control the switches of the switching unit so as to open and close, in particular depending on the phases of charging or of discharging the battery.

PRIOR ART

In order to reduce the time required to charge a battery for storing electrical energy, its charging power should be increased. To this end, it is preferable to increase the charging voltage across its terminals rather than increasing the charging current which flows there.

However, increasing the voltage for charging the battery is not compatible with the operating voltage of the components of the vehicle which the battery must supply with electrical energy, such as the air conditioning and heating system, the radio, the fans or indeed the inverters.

A first, very costly solution is known, which consists in transforming the components of the vehicle in order for their operating voltage to be equal to the charging voltage.

Document US20180062402 discloses a second solution, which consists in charging the battery at a higher charging voltage than the operating voltage of the components of the vehicle. To this end, the battery is split into battery modules, which are electrically connected to one another in series during a phase of charging the battery at high voltage. During a phase of discharging the battery, just one battery module supplies the components of the vehicle with electrical energy, the voltage delivered by this battery module being compatible with the operating voltage of said components of the vehicle. Once this battery module has reached a chosen charge drop, another battery module takes over in order to supply power to the components.

This second solution does not, however, make it possible to use the battery to supply power to the components of the vehicle when the battery is charging.

PRESENTATION OF THE INVENTION

In order to mitigate the aforementioned drawback of the prior art, the present invention proposes a battery for storing electrical energy which can supply electric power, at a first voltage, to a circuit of a vehicle, which circuit consumes electrical energy, and, simultaneously, be recharged at a second voltage which is higher than said first voltage.

More particularly, according to the invention, a battery as defined in the introduction is proposed, wherein the switching unit further comprises a system for balancing the charge of the battery modules, which is arranged on the electrical circuit and adapted to modify the electrical circuit in order to divert some of the current delivered in the direction of one of the battery modules, which is overcharged, to another of the battery modules, which is undercharged, during a mixed phase during which the battery is simultaneously charged by the charger and discharged to a consumer circuit which said battery supplies with electrical energy.

Thus, by virtue of the invention, it is possible, simultaneously, to use the battery and to recharge it quickly, without damaging the battery or the components of the vehicle which it supplies power to via the consumer circuit.

More particularly, the system for balancing the battery makes it possible to dynamically balance the level of charge of each battery module. This balancing system guarantees that the voltages of the battery modules are always at the same level of charge, controlled to within a certain margin, and does so until the end of the complete charge of the battery. The battery modules are balanced even if one of the battery modules is called upon to deliver electrical energy to the consumer circuit when the battery is being charged. Two battery modules are at the "same level of charge" when they deliver, between their respective terminals, an identical supply voltage (controlled to within said margin).

Other advantageous and non-limiting features of the battery according to the invention, these features being taken individually or in any technically possible combination, are the following:

- the switches of the switching unit are adapted to connect, during the mixed phase, the battery modules in series on the electrical circuit while at the same time connecting the consumer circuit to the terminals of at least one of the battery modules, preferably to the terminals of just one battery module;
- the switches of the switching unit are further adapted to connect said battery modules in parallel in the electrical circuit during a phase of discharging the battery into the consumer circuit, and the balancing system is adapted to modify the electrical circuit in order to divert some of the current delivered in the direction of one of the battery modules, which is overcharged, to another of the battery modules, which is undercharged, during a transient phase between said phase of charging and said phase of discharging the battery;
- the balancing system comprises at least one main balancing unit arranged as a branch from part of a branch of the electrical circuit connecting the two positive terminals of two distinct battery modules, said main balancing unit comprising a switch connected in series with a coil and in parallel with a diode (which protects said switch from a possible overvoltage);
- the closure period of the switch of said main balancing unit is controlled by pulse-width modulation, depending on the voltage across the terminals of the battery modules to be balanced and on the charging current coming from the charger;
- the balancing system comprises at least one secondary balancing unit arranged as a branch from part of a branch of the electrical circuit connecting the two negative terminals of said two distinct battery modules, and comprising a switch connected in series with a coil and in parallel with a diode (which protects said switch from a possible overvoltage);

the switch of each main and secondary balancing unit is a power transistor;

a first battery module is provided, a negative terminal of which is connected to a positive terminal of a second battery module via a first and a second diode connected in series with one another, the current input terminal of the first diode being connected to the negative terminal of the first battery module, and the current output terminal of the second diode being connected to the positive terminal of the second battery module;

provision is made for the switching unit to comprise:

a first switch having a first contact point intended to be connected to a positive terminal of the charger and a second contact point connected to the positive terminal of the first battery module, a second switch having a first contact point intended to be connected to a negative terminal of the charger and a second contact point connected to the negative terminal of the second battery module, a third switch having a first contact point connected to the positive terminal of the second battery module and a second contact point connected to one terminal of the consumer circuit, a fourth switch having a first contact point connected to the negative terminal of the second battery module and a second contact point connected to the other terminal of the consumer circuit, a fifth switch having a first contact point connected to the positive terminal of the first battery module and a second contact point connected to the current output terminal of the second diode, a sixth switch having a first contact point connected to the negative terminal of the second battery module and a second contact point connected to the current input terminal of the first diode, provision is made for the main balancing unit of the balancing system to be arranged on the electrical branch connecting the positive terminal of the first battery module and the current input terminal in the second diode, the current input terminal of the diode of said main balancing unit being connected to the current output terminal of the first diode;

the secondary balancing unit of the balancing system is arranged on the electrical branch connecting the negative terminal of the second battery module and the current input terminal of the second diode, the current output terminal of the diode of said secondary balancing unit being connected to the current output terminal of the first diode.

The invention also proposes a method for controlling a battery comprising a plurality of battery modules which are electrically connected in an electrical circuit by means of a switching unit which comprises a plurality of switches as well as a system for balancing the charge of said battery modules, according to which provision is made for a control unit to:

control the switches of the switching unit in order to connect said battery modules in series with one another, during a phase of charging said battery by means of a charger; and control the balancing system of the switching unit in order to divert some of the current delivered in the direction of one of the battery modules, which is overcharged, to another of the battery modules, which is undercharged, during a mixed phase during which the battery is simultaneously charged by the charger and discharged to said consumer circuit.

Other advantageous and non-limiting features of the method according to the invention, these features being taken individually or in any technically possible combination, are the following:

the control unit controls said switches of the switching unit in order to connect said battery modules in series while at the same time connecting the consumer circuit to the terminals of at least one of the battery modules during said mixed phase, and the control unit controls said switches of the switching unit in order to connect said battery modules in parallel with one another, during a phase of discharging the battery to a consumer circuit which it supplies with electrical energy.

Of course, the various features, variants and embodiments of the invention can be combined with one another in various combinations, provided that they are not incompatible with one another or mutually exclusive.

DETAILED DESCRIPTION OF THE INVENTION

The description which follows with reference to the appended drawings, which are given by way of non-limiting examples, will make it easy to understand what the invention consists of and how it can be embodied.

In the appended drawings:

FIG. 1 shows the circuit diagram of an example of a battery 1 according to the invention.

The battery 1 is installed in a vehicle (which is not shown), for example in an electric vehicle or in a hybrid vehicle.

The battery 1 is adapted to store electrical energy and to return it at the desired moment by delivering all or some of this stored electrical energy to a consumer circuit 4 which is internal to the vehicle, to which various components of the vehicle are connected, such as the air conditioning and heating system, the radio, the fans or indeed the inverters. The battery 1 is capable of delivering a nominal supply voltage Va, here in the order of 400 volts, to the consumer circuit 4.

In order to store the electrical energy, the battery 1 is adapted to be charged (or recharged according to common parlance) by means of an external charger 2 which delivers a charging current Ic and a charging voltage Vc. The charger 2 is known per se. It is, for example, a public or private charging station provided in the street, in a gas station, in a parking lot, etc.

In order for the charging of the battery to be quick, the charging voltage Vc delivered by the charger 2 to the battery is much higher than the supply voltage Va which the battery 1 delivers to the consumer circuit 4. For example, the charging voltage Vc is equal to twice the supply voltage Va. Here, the charging voltage Vc is in the order of 800 volts.

In order to make it possible for the battery 1 to be charged at a charging voltage Vc which is higher than the supply voltage Va which it then delivers to the consumer circuit 4, the battery 1 comprises a plurality of battery modules 1A, 1B electrically connected to one another by an electrical circuit 10 which can adopt various configurations.

Each battery module 1A, 1B is adapted to store electrical energy insofar as it comprises a plurality of electrochemical cells (which are not shown) in which said electrical energy is stored. The battery modules 1A, 1B are, for example, lithium-ion batteries.

Here, all the battery modules 1A, 1B are sized in order to deliver the same nominal supply voltage Va between their respective positive and negative terminals. To this end, the battery modules 1A, 1B all comprise the same number of electrochemical cells having the same storage capacity, connected in series with one another within the same battery module 1A, 1B.

Figure 1:
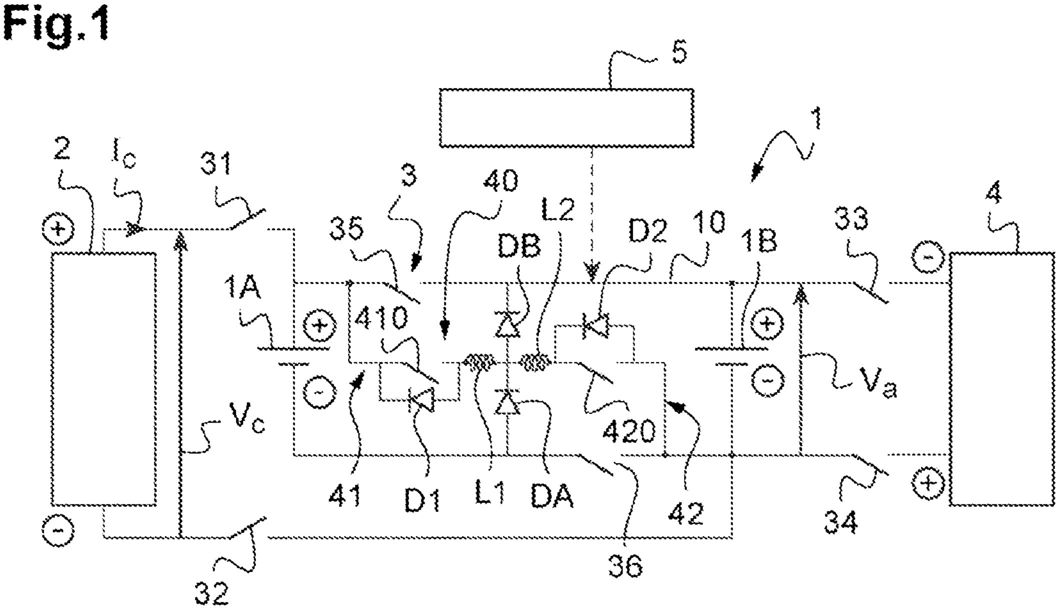
FIG. 1 shows an electrical diagram of a battery according to the invention.

In the example of FIG. 1, the battery 1 comprises a first battery module 1A and a second battery module 1B, each sized in order to deliver a nominal supply voltage Va in the order of 400 volts.

In this example, the electrical circuit 10 connects the negative terminal of the first battery module 1A to the positive terminal of the second battery module 1B via a first diode DA and a second diode DB. The first and second diodes DA and DB are connected in series with one another, so that the current input terminal of the first diode DA is connected to the negative terminal of the first battery module 1A while the current output terminal of the second diode DB is connected to the positive terminal of the second battery module 1B.

A diode conventionally lets current flow in just one direction of flow through the electrical branch on which it is connected. By convention, "current input terminal of the diode" therefore refers to the terminal through which the current enters said diode, and "current output terminal of the diode" to the terminal through which the current exits after having flowed through the diode.

In order to make it possible to electrically connect the battery modules 1A, 1B in the electrical circuit 10 according to various configurations, the battery 1 comprises a switching unit 3 comprising a plurality of switches 31, 32, 33, 34, 35, 36 which are arranged on the electrical circuit 10.

In the example of FIG. 1, the switching unit 3 comprises:

- a first switch 31 having a first contact point intended to be connected to the positive terminal of the charger 2 and a second contact point connected to the positive terminal of the first battery module 1A,
- a second switch 32 having a first contact point intended to be connected to the negative terminal of the charger 2 and a second contact point connected to the negative terminal of the second battery module 1B,
- a third switch 33 having a first contact point connected to the positive terminal of the second battery module 1B and a second contact point connected to a terminal (here the negative terminal) of the consumer circuit 4,
- a fourth switch 34 having a first contact point connected to the negative terminal of the second battery module 1B and a second contact point connected to the other terminal (here the positive terminal) of the consumer circuit 4,
- a fifth switch 35 having a first contact point connected to the positive terminal of the first battery module 1A and a second contact point connected to the current output terminal of the second diode DB,
- a sixth switch 36 having a first contact point connected to the negative terminal of the second battery module 1B and a second contact point connected to the current input terminal of the first diode DA.

By virtue of the opening and/or of the closure of each of the switches 31, 32, 33, 34, 35, 36 of the switching unit 3, the electrical circuit 10 can be adjusted in order to adopt distinct configurations which correspond to each operating phase of the battery 1. Provision is notably made for a configuration of the electrical circuit 10 for a phase of charging the battery 1 by means of the charger 2, and another configuration of the electrical circuit 10 for a phase of discharging the battery 1 into the consumer circuit 4.

In practice, the switches 31, 32, 33, 34, 35, 36 of the switching unit 3 are controlled so as to open and close by a control unit 5 depending on the operating phase of the battery 1. In other words, the control unit 5 is adapted to control the switching unit 3 in order to transform the electrical circuit 10 according to the various configurations which it is able to adopt.

The control unit 5 can be integrated into the battery 1 or remote from said battery 1. The control unit 5 comprises, for example, an electronic circuit with a microprocessor which includes a central processing unit (CPU), a random-access and/or read-only memory storing information, and an interface for communicating with the battery 1. The random-access and/or read-only memory notably stores information on the electrical circuit 10, on the supply voltages Va detected across the terminals of each of the battery modules 1A, 1B, on the charging current Ic and the charging voltage Vc which are delivered by the charger 2.

During a phase of charging the battery 1 by means of the charger 2, the switches 31, 32, 33, 34, 35, 36 of the switching unit 3 are controlled in order to connect the positive terminal of the battery 1 to the positive terminal of the charger 2 and the negative terminal of the battery 1 to the negative terminal of the charger 2. During the phase of charging the battery 1, the switches 31, 32, 33, 34, 35, 36 are further controlled in order to connect the battery modules 1A, 1B in series in the electrical circuit 10.

In the example of FIG. 1, during the phase of charging the battery 1, the first and second switches 31, 32 are therefore closed, while the third, fourth, fifth and sixth switches 34, 35, 36, 37 are open.

By contrast, during a phase of discharging the battery 1 into the consumer circuit 4 of the vehicle, the switches 31, 32, 33, 34, 35, 36 are controlled in order to connect the positive terminal of the battery 1 to the negative terminal of the consumer circuit 4, and the negative terminal of the battery 1 to the positive terminal of the consumer circuit 4. During the phase of discharging the battery 1, the switches 31, 32, 33, 34, 35, 36 are also controlled in order to connect the battery modules 1A, 1B in parallel in the electrical circuit 10.

In the example of FIG. 1, during the phase of discharging the battery 1, the third, fourth, fifth and sixth switches 33, 34, 35, 36 are therefore closed, while the first and second switches 31, 32 are open.

The battery 1 according to the invention is further adapted to operate in a mixed phase during which the battery 1 is simultaneously charged by the charger 2, at the charging voltage Vc, and discharged to the consumer circuit 4, which it supplies power to at the supply voltage Va.

Such a mixed operating phase of the battery 1 therefore makes it possible for a user of the vehicle to recharge the battery 1 while at the same time using one of the components of the vehicle, for example the air conditioning system or the radio. During the mixed operating phase, the switches 31, 32, 33, 34, 35, 36 of the switching unit 3 are controlled in order to connect the positive terminal of the battery 1 to the positive terminal of the charger 2 and the negative terminal of the battery 1 to the negative terminal of the charger 2. During the mixed operating phase, the switches 31, 32, 33, 34, 35, 36 are further controlled in order to connect the battery modules 1A, 1B in series on the electrical circuit 10 while at the same time connecting the consumer circuit 4 to the terminals of at least one of the battery modules 1A, 1B (the positive terminal of one of the battery modules 1A, 1B to the positive terminal of the consumer circuit 4 and the negative terminal of said at least one battery module 1A, 1B to the negative terminal of the consumer circuit 4).

In the example of FIG. 1, during a mixed operating phase of the battery 1, the first, second, third and fourth switches 31, 32, 33, 34 are therefore closed, while the fifth and sixth switches 35, 36 are open. The consumer circuit 4 is then electrically connected to the terminals of just the second battery module 1B.

Remarkably, the switching unit 3 further comprises a balancing system 40 which is responsible for dynamically balancing the charge of the battery modules 1A, 1B, most particularly when said battery modules 1A, 1B are simultaneously charged and discharged. The balancing system 40 notably makes it possible to preserve the components of the electrical circuit 10 and the components of the vehicle which are connected to the consumer circuit 4, during the mixed operating phase of the battery 1.

The balancing system 40 is arranged on the electrical circuit 10 and adapted to modify the latter in order to divert some of the current which is delivered in the direction of one of the battery modules 1A, 1B, which is overcharged, to another of the battery modules 1A, 1B, which is undercharged. Thus, some of the current, intended to supply power to one of the battery modules 1A, 1B when no balancing is implemented, is, if necessary, diverted by the balancing system 40 during the mixed phase. More particularly, when the balancing system 40 is activated, it diverts some of the current intended to supply power to the overcharged battery module 1A, 1B to supply more power to the undercharged battery module 1A, 1B, notably because the latter is simultaneously discharged into the consumer circuit 4. The balancing is said to be "dynamic" insofar as, on the one hand, it can be carried out while the battery modules 1A, 1B are being charged and discharged, and, on the other hand, it does not interfere with the charging and the discharging of said battery modules 1A, 1B.

The balancing system 40 comprises at least one main balancing unit 41 arranged as a branch from part of a branch of the electrical circuit 10 which connects the two positive terminals of two distinct battery modules 1A, 1B.

As FIG. 1 shows, the main balancing unit 41 here comprises a switch 410 connected in series with a coil L1 and in parallel with a diode D1. The diode D1 protects said switch 410 from a possible overvoltage. Here, the switch 410 of the main balancing unit 41 is a power transistor.

In the example of FIG. 1, the main balancing unit 41 of the balancing system 40 is arranged on the electrical branch connecting the positive terminal of the first battery module 1A and the current input terminal of the second diode DB. The current input terminal of the diode D1 of said main balancing unit 41 is connected to the current output terminal of the first diode DA.

In the example of FIG. 1, the main balancing unit 41 makes it possible, when the switch 410 is closed, to transfer some of the charging current Ic coming from the charger 2, normally intended to recharge the first battery module 1A, in the direction of the second battery module 1B, which is for its part undercharged with respect to said first battery module 1A because it is being discharged into the consumer circuit 4.

When the switch 410 is closed, a current ramp appears in the branch of the electrical circuit 10 which carries the coil L1. The longer the closure period of the switch 410, the larger the amount of current transferred through the main balancing unit 41, in the direction of the second battery module 1B. In order to achieve precise and fine balancing, the switch 410 should be controlled so as to open and close at a frequency in the order of 50 kHz.

The diode D1 of the main balancing unit 41 makes it possible to protect the switch 410 when it is opened. When the switch 410 is opened, current continues to flow through the main balancing unit 41 due to the coil L1. The so-called "freewheeling" diode D1 allows some of this current to flow in the direction of the positive terminal of the first battery module 1A, when the switch 410 is opened, and thus prevents said switch 410 from tripping.

The closure period of the switch 410 of the main balancing unit 41 is controlled by pulse-width modulation. The width of the control pulses is modulated depending, on the one hand, on the supply voltage Va detected across the terminals of the battery modules 1A, 1B to be balanced, and, on the other hand, on the charging current Ic coming from the charger 2.

Here, it is the control unit 5 which controls the pulses for opening and closing the switch 410 of the main balancing unit 41 of the balancing system 40.

In order to make it possible to balance the battery modules 1A, 1B in both directions, that is to say, on the one hand, from a first of the battery modules 1A, 1B, which is overcharged, to a second of the battery modules 1A, 1B, which is undercharged, and, on the other hand, from said second of the battery modules, which has become overcharged during operation, to said first of the battery modules 1A, 1B, which has for its part become undercharged, the balancing system 40 also comprises a secondary balancing unit 42 arranged as a branch from part of a branch of the electrical circuit 10 which connects the two negative terminals of said two distinct battery modules 1A, 1B.

As FIG. 1 shows, the secondary balancing unit 42 is similar here to the main balancing unit 41. It comprises a switch 420 connected in series with a coil L2 and in parallel with a diode D2. The diode D2 protects said switch 420 from a possible overvoltage. Here, the switch 420 of the secondary balancing unit 42 is a power transistor.

In the example of FIG. 1, the secondary balancing unit 42 of the balancing system 40 is arranged on the electrical branch of the electrical circuit 10 connecting the negative terminal of the second battery module 1B and the current input terminal of the second diode DB. The current output terminal of the diode D2 of said secondary balancing unit 42 is connected to the current output terminal of the first diode DA.

In the example of FIG. 1, by virtue of operating in a similar way to that described for the main balancing unit 41, the secondary balancing unit 42 makes it possible, when the switch 420 is closed, to transfer some of the current intended to recharge the second battery module 1B, which is then overcharged, in the direction of the first battery module 1A which is for its part undercharged with respect to the second battery module 1B.

The control unit 5 also controls the pulses for closing and opening the switch 420 of the secondary balancing unit 42 of the balancing system 40. The width of the pulses is modulated depending, on the one hand, on the voltage across the terminals of the battery modules 1A, 1B to be balanced, and, on the other hand, on the charging current Ic coming from the charger 2.

The inductance of the coil L1 and the characteristic of the diode D1, just like the inductance of the coil L2 and the characteristic of the diode D2, are fixed once and for all, depending on the power of the battery 1 and on a value of the maximum tolerated imbalance in the supply voltage Va across the terminals of the battery modules 1A, 1B. The inductance of the coil L2 is not necessarily identical to that of the coil L1, just as the characteristics of the diodes D1 and D2 are not necessarily identical.

When the balancing system 40 is activated, the control unit 5 never controls the switches 410, 420 of the main and secondary balancing units 41, 42 so as to close simultaneously. On the contrary, the control unit 5 controls said switches 410, 420 so as to close alternately. When the balancing system 40 is deactivated, the switches 410, 420 of the main and secondary balancing units 41, 42 are opened simultaneously.

Advantageously, the balancing system 40 described previously is also adapted to modify the electrical circuit 10 in order to divert some of the current delivered in the direction of one of the battery modules 1A, 1B, which is overcharged, to another of the battery modules 1A, 1B, which is undercharged, during a transient phase of the battery 1 after the phase of charging but before the phase of discharging said battery 1.

The transient operating phase is the phase which occurs at the end of charging the battery 1, and before the electrical circuit 10 is configured for the phase of discharging the battery 1.

During the transient operating phase of the battery 1, the switches 31, 32, 33, 34, 35, 36 of the switching unit 3 are controlled in order to disconnect, on the one hand, the positive terminal of the battery 1 and the positive terminal of the charger 2, and, on the other hand, the negative terminal of the battery 1 and the negative terminal of the charger 2. During the transient phase, the battery modules 1A, 1B are not yet placed in parallel in the electrical circuit 10.

In the example of FIG. 1, during the transient phase of the battery 1, the first and second switches 31, 32 are therefore open, just like the fifth and sixth switches 35, 36. The third and fourth switches 33, 34 are also open.

When the first and second switches 31, 32 are open at the end of the phase of charging the battery 1 or at the end of the mixed phase of the battery 1, on occasion the two battery modules 1A, 1B, though dynamically balanced by the balancing system 40, are not quite at the same level of charge, and therefore are not capable of delivering the same nominal supply voltage Va between their terminals. The balancing system 40 makes it possible to remedy this imbalance and the control unit 5 controls the closing and opening pulses, and the alternation between the switches 410, 420 of the main and secondary balancing units 41, 42, until balance is restored.

Figure 2:
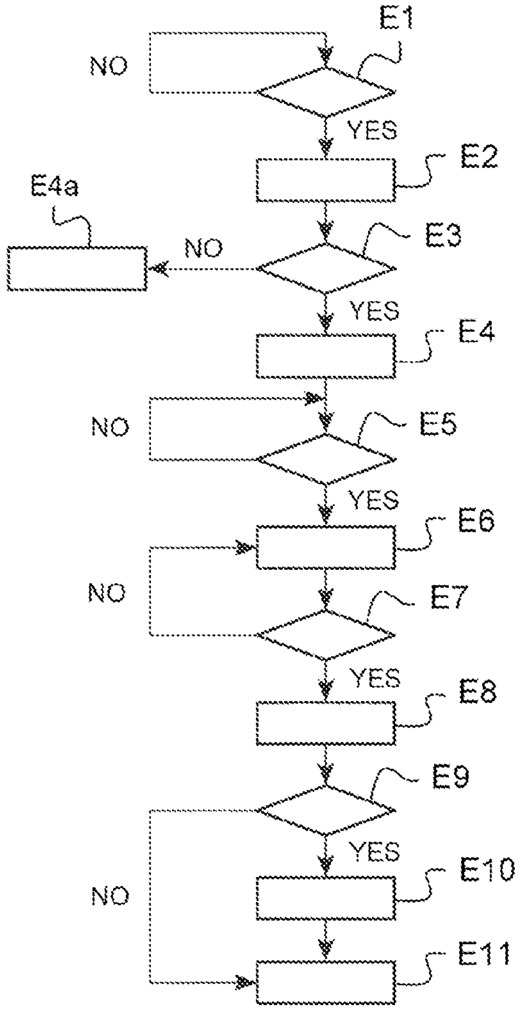
FIG. 2 is a diagram showing the main steps of a control method according to the invention.

FIG. 2 shows the main steps of an example of a method for controlling the battery 1 described previously.

According to the control method of the invention, provision is made for the control unit 5 to:

- control the switches 31, 32, 33, 34, 35, 36 of the switching unit 3 in order to connect said battery modules 1A, 1B in series with one another, during the phase of charging said battery 1 by means of the charger 2; and
- control the balancing system 40 of the switching unit 3 in order to divert some of the current delivered in the direction of one of the battery modules 1A, 1B, which is overcharged, to another of the battery modules 1A, 1B, which is undercharged, during the mixed phase during which the battery 1 is simultaneously charged by the charger 2 and discharged to said consumer circuit 4.

The control unit 5 further controls, during the mixed phase, the switches 31, 32, 33, 34, 35, 36 of the switching unit 3 in order to connect said battery modules 1A, 1B in series while at the same time connecting the consumer circuit to the terminals of at least one of the battery modules 1A, 1B. More specifically, as FIG. 2 shows, the control unit 5 determines, during a step E1, if the charger 2 is connected to the electrical circuit 10. If the charger is not connected to the circuit, the control unit 5 repeats the step E1 until the charger 2 is connected to the electrical circuit 10.

If the charger 2 is connected to the electrical circuit 20, the control unit 5 controls, during a step E2, the switches 31, 32, 33, 34, 35, 36 of the switching unit 3 in order to connect said battery modules 1A, 1B in series with one another. The electrical circuit 10 then adopts the configuration associated with the phase of charging the battery 1 described previously.

During a step E3, the control unit 5 then determines whether the components of the vehicle which are connected to the consumer circuit 4 are active or activated by a user of the vehicle.

If no component of the vehicle is active, the charging of the battery 1 takes place according to a conventional known method, which is indicated by the step E4*a* in FIG. 2. According to this known method, the electrochemical cells are monitored by means of a cell voltage sensor (CVS) so that, as soon as one of them reaches a higher voltage than that of the other electrochemical cells of the same battery module, it discharges into a resistor.

On the other hand, if at least one component of the vehicle is active, or as soon as the control unit 5 detects that a component of the vehicle is activated, the consumer circuit 4 is connected to the battery 1 (step E4 of FIG. 2). During this step E4, the control unit 5 controls the switches 31, 32, 33, 34, 35, 36 of the switching unit 3 in order to connect the consumer circuit 4 to the terminals of at least one of the battery modules 1A, 1B. The electrical circuit 10 then adopts the configuration associated with the mixed operating phase of the battery 1 described previously.

During a step E5, the control unit 5 then determines whether there is a charge imbalance between the battery modules 1A, 1B. To this end, the control unit 5 determines the supply voltage Va across the terminals of each battery module 1A, 1B, using a voltage detection unit (which is not shown).

If no imbalance is detected by the control unit 5, the control unit 5 repeats the step E5 until an imbalance is detected.

When an imbalance is detected by the control unit 5, the latter controls, during a step E6, the balancing system 40 of the switching unit 3 in order to divert some of the current normally intended to supply power to one of the battery modules 1A, 1B, which is overcharged, to another of the battery modules 1A, 1B, which is undercharged. In this step E6, the control unit 5 controls the balancing system 40 so as to activate and, more particularly, the closure and opening period of the switches 410, 420 of the balancing system 40, by means of pulse-width modulation, as well as said switches 410, 420 so as to close alternately.

During a step E7, the control unit 5 determines whether the rebalancing of the charge of the battery modules 1A, 1B is complete. If this is not the case, that is to say in the event that the control unit 5 determines that the supply voltages Va across the terminals of the battery modules 1A, 1B are different, the control unit 5 repeats the step E6 described previously.

If, on the contrary, the control unit 5 determines that the rebalancing is complete, that is to say that the supply voltages Va across the terminals of the battery modules 1A, 1B are broadly equal, the control unit 5 controls, during a step E8, the switches 31, 32, 33, 34, 35, 36 of the switching unit 3 in order to disconnect the charger 2. In practice, the control unit 5 controls the first and second switches 31, 32 so as to open during the step E8. The electrical circuit 10 then adopts the configuration associated with the transient phase of the battery 1 described previously.

During a step E9, the control unit 5 then determines again whether the battery modules 1A, 1B have been unbalanced by the opening of said first and second switches 31, 32.

If the control unit 5 detects an imbalance, the control unit 5 again controls, during a step E10, the balancing system 40 so as to activate in a manner which is similar to that described for the step E6.

Once the supply voltages Va across the terminals of the battery modules 1A, 1B are equal, the control unit 5 controls, during a step E11, the switches 31, 32, 33, 34, 35, 36 of the switching unit 3 in order to connect said battery modules 1A, 1B in parallel to one another.

The electrical circuit 10 then adopts the configuration associated with the phase of discharging the battery 1 described previously. The balancing system 40 is then deactivated, that is to say that the switches 410, 420 are left open.

When, in the step E9, the control unit 5 detects no imbalance, the control unit 5 directly implements the step E11 described above.

Thus, by virtue of the battery 1 according to the invention and of its control method, it is possible to recharge the battery 1 at the same time that it is used. For example, with two identical battery modules 1A, 1B of 40 kilowatt-hours (kWh) each, which are capable of delivering a nominal voltage of 400 volts each when they are fully charged, and two coils L1 and L2 of 200 microhenries (µH), if an imbalance of 30 volts appears between said battery modules 1A, 1B, the balancing system 40 according to the invention is capable of diverting up to 10 amperes (A) of current to the undercharged module, in order to compensate for this imbalance. In practice, such an imbalance of 30 V between two battery modules 1A, 1B is never reached because said battery modules 1A, 1B are rebalanced dynamically, that is to say as they drift. Thus, the balancing system 40 generally diverts much lower currents from one to the other of said battery modules 1A, 1B.

The present invention is in no way limited to the embodiments which have been described and shown, but a person skilled in the art will know how to add thereto any variant according to the invention.

Notably, the battery could contain more than two battery modules. The battery modules could also have a different storage capacity, in which case the electrical circuit and the various configurations which it is able to adopt are adapted accordingly.

The invention claimed is:

1. A battery for storing electrical energy comprising:
- a plurality of battery modules which are electrically connected by an electrical circuit, each battery module being configured to store electrical energy; and
- a switching unit which comprises a plurality of switches which are arranged on the electrical circuit and configured to connect the battery modules in series in the electrical circuit during a phase of charging the battery by a charger,
- wherein the switching unit further comprises a balancing system for balancing the charge of the battery modules, which is arranged on the electrical circuit and configured to modify the electrical circuit in order to divert some of a current delivered in a direction of one of the battery modules, which is overcharged, to another of the battery modules, which is undercharged, during a mixed phase during which the battery is simultaneously charged by the charger and discharged to a consumer circuit which said battery supplies with electrical energy,
- wherein the balancing system comprises at least one main balancing unit, the main balancing unit comprising a switch connected in series with a coil and in parallel with a diode, and
- wherein a closure period of the switch of the main balancing unit is controlled by pulse-width modulation.

2. The battery as claimed in claim 1, wherein the switches of the switching unit are configured to connect, during the mixed phase, the battery modules in series on the electrical circuit while at the same time connecting the consumer circuit to terminals of at least one of the battery modules.

3. The battery as claimed in claim 1, wherein the switches of the switching unit are configured to connect, during the mixed phase, the battery modules in series on the electrical circuit while at the same time connecting the consumer circuit to terminals of one of the battery modules.

4. The battery as claimed in claim 1, wherein the switches of the switching unit are further configured to connect said battery modules in parallel in the electrical circuit during a phase of discharging the battery into the consumer circuit, and the balancing system is configured to modify the electrical circuit in order to transfer some of the current supplying power to one of the battery modules, which is overcharged, to another of the battery modules, which is undercharged, during a transient phase between said phase of charging and said phase of discharging the battery.

5. The battery as claimed in claim 1, wherein the main balancing unit is arranged as a branch from part of a branch of the electrical circuit connecting two positive terminals of two distinct battery modules.

6. The battery as claimed in claim 5, wherein the closure period of the switch of said main balancing unit is controlled by the pulse-width modulation, depending on a supply voltage across the terminals of the battery modules to be balanced and on the charging current coming from the charger.

7. The battery as claimed in claim 5, wherein the balancing system comprises at least one secondary balancing unit arranged as a branch from part of a branch of the electrical circuit connecting two negative terminals of said two distinct battery modules, and comprising a switch connected in series with a coil and in parallel with a diode.

8. The battery as claimed in claim 5, wherein a switch of each balancing unit is a power transistor.

9. The battery as claimed in claim 5,
- wherein the battery modules include a first battery module and a second battery module, a negative terminal of the first battery module is connected to a positive terminal of the second battery module via a first and a second diode connected in series with one another, a current input terminal of the first diode being connected to the negative terminal of the first battery module, and a current output terminal of the second diode being connected to the positive terminal of the second battery module, wherein the switching unit comprises:

a first switch having a first contact point intended to be connected to a positive terminal of the charger and a second contact point connected to the positive terminal of the first battery module, a second switch having a first contact point intended to be connected to a negative terminal of the charger and a second contact point connected to the negative terminal of the second battery module, a third switch having a first contact point connected to the positive terminal of the second battery module and a second contact point connected to one terminal of the consumer circuit, a fourth switch having a first contact point connected to the negative terminal of the second battery module and a second contact point connected to the other terminal of the consumer circuit, a fifth switch having a first contact point connected to the positive terminal of the first battery module and a second contact point connected to the current output terminal of the second diode, and a sixth switch having a first contact point connected to the negative terminal of the second battery module and a second contact point connected to the current input terminal of the first diode, and wherein the main balancing unit of the balancing system is arranged on the electrical branch connecting the positive terminal of the first battery module and a current input terminal in the second diode, the current input terminal of the diode of said main balancing unit being connected to the current output terminal of the first diode.

10. The battery as claimed in claim 9, wherein the balancing system comprises at least one secondary balancing unit arranged as a branch from part of a branch of the electrical circuit connecting two negative terminals of said two distinct battery modules, and comprising a switch connected in series with a coil and in parallel with a diode, and wherein the secondary balancing unit of the balancing system is arranged on the electrical branch connecting the negative terminal of the second battery module and the current input terminal of the second diode, the current output terminal of the diode of said secondary balancing unit being connected to the current output terminal of the first diode.

11. A method for controlling a battery comprising a plurality of battery modules which are electrically connected in an electrical circuit by a switching unit which comprises a plurality of switches as well as a balancing system for balancing a charge of said battery modules, the method comprising:

controlling, via control circuitry, the switches of the switching unit in order to connect said battery modules in series with one another, during a phase of charging said battery by a charger; and controlling, via the control circuitry, the balancing system of the switching unit in order to divert some of the current delivered in a direction of one of the battery modules, which is overcharged, to another of the battery modules, which is undercharged, during a mixed phase during which the battery is simultaneously charged by the charger and discharged to a consumer circuit, wherein the balancing system comprises at least one main balancing unit, the main balancing unit comprising a switch connected in series with a coil and in parallel with a diode, and a closure period of the switch of the main balancing unit is controlled by pulse-width modulation.

12. A battery for storing electrical energy comprising:

a plurality of battery modules which are electrically connected by an electrical circuit, each battery module being configured to store electrical energy; and a switching unit which comprises a plurality of switches which are arranged on the electrical circuit and configured to connect the battery modules in series in the electrical circuit during a phase of charging the battery by a charger, wherein the switching unit further comprises a balancing system for balancing the charge of the battery modules, which is arranged on the electrical circuit and configured to modify the electrical circuit in order to divert some of a current delivered in a direction of one of the battery modules, which is overcharged, to another of the battery modules, which is undercharged, during a mixed phase during which the battery is simultaneously charged by the charger and discharged to a consumer circuit which the battery supplies with electrical energy, wherein the balancing system comprises at least one main balancing unit is arranged as a branch from part of a branch of the electrical circuit connecting two positive terminals of two distinct battery modules, the main balancing unit comprising a switch connected in series with a coil and in parallel with a diode, wherein the battery modules include a first battery module and a second battery module, a negative terminal of the first battery module is connected to a positive terminal of the second battery module via a first and a second diode connected in series with one another, a current input terminal of the first diode being connected to the negative terminal of the first battery module, and a current output terminal of the second diode being connected to the positive terminal of the second battery module, wherein the switching unit comprises:

a first switch having a first contact point intended to be connected to a positive terminal of the charger and a second contact point connected to the positive terminal of the first battery module, a second switch having a first contact point intended to be connected to a negative terminal of the charger and a second contact point connected to the negative terminal of the second battery module, a third switch having a first contact point connected to the positive terminal of the second battery module and a second contact point connected to one terminal of the consumer circuit, a fourth switch having a first contact point connected to the negative terminal of the second battery module and a second contact point connected to the other terminal of the consumer circuit, a fifth switch having a first contact point connected to the positive terminal of the first battery module and a second contact point connected to the current output terminal of the second diode, and a sixth switch having a first contact point connected to the negative terminal of the second battery module and a second contact point connected to the current input terminal of the first diode, and wherein the main balancing unit of the balancing system is arranged on the electrical branch connecting the positive terminal of the first battery module and a current input terminal in the second diode, the current input terminal of the diode of the main balancing unit being connected to the current output terminal of the first diode.

* * * * *